(12) United States Patent
Wang et al.

(10) Patent No.: US 12,535,511 B2
(45) Date of Patent: Jan. 27, 2026

(54) CURRENT DETECTION APPARATUS, ELECTRIC ENERGY DETECTION APPARATUS, AND METHOD FOR CONTROLLING CURRENT DETECTION APPARATUS

(71) Applicant: Huawei Digital Power Technologies Co., Ltd., Shenzhen (CN)

(72) Inventors: Shuai Wang, Dongguan (CN); Jian Wu, Dongguan (CN)

(73) Assignee: HUAWEI DIGITAL POWER TECHNOLOGIES CO., LTD., Shenzhen (CN)

( * ) Notice: Subject to any disclaimer, the term of this patent is extended or adjusted under 35 U.S.C. 154(b) by 175 days.

(21) Appl. No.: 18/492,070

(22) Filed: Oct. 23, 2023

(65) Prior Publication Data

US 2024/0044947 A1 Feb. 8, 2024

Related U.S. Application Data

(63) Continuation of application No. PCT/CN2021/089124, filed on Apr. 23, 2021.

(51) Int. Cl.
*G01R 19/00* (2006.01)
*G01R 22/10* (2006.01)

(52) U.S. Cl.
CPC ......... *G01R 19/0092* (2013.01); *G01R 22/10* (2013.01)

(58) Field of Classification Search
CPC ..... G01R 19/0092; G01R 22/10; G01R 21/06; H02J 7/345
See application file for complete search history.

(56) References Cited

U.S. PATENT DOCUMENTS

| | | | |
|---|---|---|---|
| 8,239,150 B2 * | 8/2012 | Baumheinrich | F03D 80/30 702/65 |
| 11,450,191 B2 * | 9/2022 | Thompson | G08B 7/06 |
| 2012/0223697 A1 | 9/2012 | Lee et al. | |
| 2015/0145500 A1 | 5/2015 | Oshima et al. | |
| 2016/0146856 A1 * | 5/2016 | Komiya | G01R 15/26 324/126 |
| 2018/0306846 A1 | 10/2018 | Lanzisera et al. | |
| 2018/0323649 A1 * | 11/2018 | Dondolini | H02J 50/001 |
| 2019/0116403 A1 * | 4/2019 | Yogeeswaran | H04B 10/2575 |
| 2020/0052488 A1 * | 2/2020 | Desmarais | H01F 38/28 |
| 2022/0166244 A1 * | 5/2022 | Schaefer | H02J 9/06 |

FOREIGN PATENT DOCUMENTS

| | | |
|---|---|---|
| CN | 102472777 A | 5/2012 |
| CN | 105445531 A | 3/2016 |
| CN | 107064597 A | 8/2017 |
| JP | 2015040799 A | 3/2015 |
| JP | 6194682 B2 | 9/2017 |

(Continued)

*Primary Examiner* — Dominic E Hawkins
(74) *Attorney, Agent, or Firm* — Conley Rose, P.C.

(57) ABSTRACT

A current detection apparatus includes a first transformation unit, a power supply unit, a current detection unit, and a processing unit. A detected cable passes through a hollow part of the first transformation unit. The power supply unit is connected to the first transformation unit. The current detection unit is connected to the first transformation unit. The processing unit calculates a current value on the detected cable.

20 Claims, 10 Drawing Sheets

(56) References Cited

FOREIGN PATENT DOCUMENTS

| | | | |
|---|---|---|---|
| JP | 2018132346 | A | 8/2018 |
| JP | 2020016515 | A | 1/2020 |
| WO | 2014027422 | A1 | 2/2014 |
| WO | 2016081657 | A1 | 5/2016 |
| WO | 2020109283 | A2 | 6/2020 |

\* cited by examiner

CURRENT DETECTION APPARATUS, ELECTRIC ENERGY DETECTION APPARATUS, AND METHOD FOR CONTROLLING CURRENT DETECTION APPARATUS

CROSS-REFERENCE TO RELATED APPLICATIONS

This is a continuation of International Patent Application No. PCT/CN2021/089124 filed on Apr. 23, 2021, the disclosure of which is hereby incorporated by reference in its entirety.

TECHNICAL FIELD

This application relates to the field of electric energy detection, and in particular, to a current detection apparatus, an electric energy detection apparatus, and a method for controlling a current detection apparatus.

BACKGROUND

An alternating-current current detection apparatus detects an alternating current on a detected cable, and calculates the alternating current to obtain a current transmitted by the detected cable, to collect statistics on the current.

Generally, an existing current detection apparatus may detect an alternating current by using an electrical connection point disposed on a detected cable. As shown in FIG. 1, an electrical connection point for current detection is specially reserved on a neutral wire and a live wire of a detected cable; after a conducting wire is led out from the electrical connection point, voltage division and step-down are performed by using a resistor; and a signal is processed and is finally input to an analog-to-digital converter (ADC), to implement current detection.

During actual use, a dedicated power supply needs to be configured to supply power to the current detection apparatus. As shown in FIG. 2, the current detection apparatus may be connected to an external power supply, and power is supplied to the current detection apparatus by using electric energy output by the external power supply, to ensure normal working of the alternating-current current detection apparatus.

However, in the foregoing connection manner, an electrical connection point specially used for detection wiring on an alternating current voltage needs to be reserved on the detected cable, and a dedicated power supply further needs to be configured to supply power to the current detection apparatus. Therefore, an installation location of the current detection apparatus is limited by a location of the power supply and the electrical connection point, and various problems such as production compliance and costs of the electrical connection point further need to be considered.

SUMMARY

This application provides a current detection apparatus, an electric energy detection apparatus, and a method for controlling a current detection apparatus, to prevent an installation location of the detection apparatus from being limited by an electrical connection point and a location of a power supply. In addition, there is no electrical connection between the detection apparatus and a detected cable. Therefore, when an alternating current is detected, a production compliance level of the detection apparatus can be increased and costs are reduced.

According to a first aspect, an embodiment of this application provides a current detection apparatus. The current detection apparatus includes a first transformation unit, a power supply unit, a current detection unit, and a processing unit.

The first transformation unit includes a hollow part, a detected cable passes through the hollow part, and the first transformation unit is configured to generate a first induction electrical parameter and a second induction electrical parameter based on an actual current on the detected cable. The power supply unit is connected to the first transformation unit, and the power supply unit is configured to: convert a voltage in the first induction electrical parameter into a first voltage, and supply power to the processing unit, where the first voltage is a supply voltage of the processing unit. The current detection unit is connected to the first transformation unit, and the current detection unit is configured to convert a current in the second induction electrical parameter into a second voltage. The processing unit is connected to the power supply unit and the current detection unit, and the processing unit is configured to calculate a current value on the detected cable based on the second voltage that is output by the current detection unit.

Based on the foregoing apparatus, the detected cable is not connected to the current detection apparatus by using an electrical connection point, so that an installation location of the current detection apparatus can be effectively prevented from being limited by the electrical connection point. There is no electrical connection between the current detection apparatus and the detected cable. Therefore, a production compliance level of the current detection apparatus can be increased and costs of an alternating current electric energy detection apparatus are reduced. In addition, a dedicated power supply does not need to be configured to supply power to the current detection apparatus, so that the location of the current detection apparatus can be effectively prevented from being limited by a location of the power supply.

In a possible design, the apparatus further includes a switch unit.

The switch unit is connected between the first transformation unit and the power supply unit, and is connected between the first transformation unit and the current detection unit, and the switch unit is configured to: connect the first transformation unit to the power supply unit, or connect the first transformation unit to the current detection unit.

Based on the foregoing apparatus, an induction electrical parameter is generated by a secondary side winding of a transformation unit. Because two windings that generate the first induction electrical parameter and the second induction electrical parameter share one magnetic core, when the two windings are jointly closed to generate the induction electrical parameters, to avoid impact of self-excitement of the two windings on values of the induction electrical parameters, the current detection apparatus may include the switch unit. The switch unit prevents the two windings from being both closed, so that impact, on detection of a backend connection device, of self-excitement parameters generated when the two windings are both closed is effectively avoided.

In a possible design, the switch unit includes a first switch and a second switch.

The first switch is connected between the first transformation unit and the power supply unit. The second switch is connected between the first transformation unit and the current detection unit. The first switch and the second switch are complementarily turned on.

In a possible design, the current detection apparatus further includes a controller connected to the switch unit.

The controller is configured to control the first switch and the second switch to be turned off and turned on.

Based on the foregoing apparatus, under control of the controller, a connection between the first transformation unit and the current detection unit or a connection between the first transformation unit and the power supply unit is implemented.

In a possible design, the power supply unit includes a regulator circuit and an energy storage unit.

The regulator circuit is connected to the first transformation unit, and the regulator circuit is configured to convert the voltage in the first induction electrical parameter into the first voltage. The energy storage unit is connected to the regulator circuit, and the energy storage unit is configured to store the first voltage that is output by the regulator circuit.

Based on the foregoing apparatus, an output voltage of the power supply unit is converted, by using the regulator circuit, into a supply voltage of a device connected to the power supply unit, and an output voltage of the regulator circuit is stored by using the energy storage unit, to avoid a problem that when load of the connected device changes (for example, increases), the output voltage drops rapidly, and a power supply requirement cannot be met.

In a possible design, the current detection unit is a resistor and a current sampling circuit.

Two ends of the resistor are connected to the first transformation unit; and the current sampling circuit is connected to the resistor in parallel.

In a possible design, the first transformation unit is a ring-shaped magnetic core that is wound with a first winding and a second winding; and the ring-shaped magnetic core is of a closed or non-closed structure, the ring-shaped magnetic core is made of a metal material, the first winding is connected to the power supply unit, and the second winding is connected to the current detection unit.

Based on the foregoing apparatus, the first induction electrical parameter may be generated on the first winding and the second induction electrical parameter may be generated on the second winding through electromagnetic induction generated when the detected cable passes through the ring-shaped magnetic core.

According to a second aspect, an embodiment of this application provides an electric energy detection apparatus. The electric energy detection apparatus includes a second transformation unit, a voltage detection unit, and the current detection apparatus provided in any one of the possible designs of the first aspect of embodiments of this application.

The second transformation unit is located in a hollow part of a first transformation unit in the current detection apparatus, and the second transformation unit is configured to generate a third induced voltage based on an actual voltage of a detected cable. The voltage detection unit is separately connected to a power supply unit in the current detection apparatus and the second transformation unit, and the voltage detection unit is configured to: convert the third induced voltage into a third voltage, and output the third voltage to a processing unit in the current detection apparatus. The current detection apparatus is coupled to the detected cable, and the current detection apparatus is configured to: detect a current value on the detected cable, and calculate, based on the third voltage and the current value on the detected cable, electric energy transmitted on the detected cable.

Based on the foregoing apparatus, because neither a current nor a voltage is obtained from an electrical connection point, an installation location of an alternating current electric energy detection apparatus can be prevented from being limited by the electrical connection point. In addition, there is no electrical connection between the alternating current electric energy detection apparatus and the detected cable. On a premise that information is detected in real time, such as an amplitude and a phase of a detected voltage and all harmonics of the detected cable, a production compliance level of the alternating current electric energy detection apparatus can be increased, and costs of the alternating current electric energy detection apparatus are reduced.

In a possible design, the second transformation unit is of a closed or non-closed cylindrical structure; and the second transformation unit is made of a metal material, the second transformation unit and the detected cable form a coupling capacitor, and a voltage at two ends of the coupling capacitor is the third induced voltage.

To ensure an effect of capacitive coupling, the second transformation unit may be made of the metal material, and the metal material may be copper, aluminum, or the like. For example, the second transformation unit may be a foil made of a copper material, and the copper foil may be coiled in a closed or non-closed manner. After the copper foil is sleeved outside the detected cable, the coupling capacitance is generated between the detected cable and the copper foil. In addition, the second transformation unit may alternatively be of a polygonal cylindrical structure, such as a square cylindrical structure or a rectangular cylindrical structure. In addition, the second transformation unit may alternatively be of a non-cylindrical metal bipolar plate structure. A metal bipolar plate is disposed on two sides of the detected cable, so that the detected cable passes through the metal bipolar plate, thereby forming coupling capacitance with the detected cable.

In a possible design, the voltage detection unit is a voltage signal processing circuit.

According to a third aspect, an embodiment of this application provides a method for controlling a current detection apparatus, applied to a current detection apparatus, where the current detection apparatus includes a first transformation unit, a power supply unit, a current detection unit, a processing unit, and a switch unit, where the switch unit is separately connected to the first transformation unit, the power supply unit, and the current detection unit, and the control method includes: detecting a first voltage that is output by the power supply unit; and when it is determined that the first voltage is greater than or equal to a first preset threshold, disconnecting the first transformation unit from the power supply unit, and connecting the first transformation unit to the current detection unit; or when it is determined that the first voltage is less than or equal to a second preset threshold, connecting the first transformation unit to the power supply unit, and disconnecting the first transformation unit from the current detection unit.

Based on the foregoing method, the power supply unit and the current detection unit may be connected to the first transformation unit in a polling mode, so that impact, on detection of the current detection unit, of self-excitation of two secondary side windings of the first transformation unit that is generated when the two windings are both closed can be effectively avoided.

In a possible design, the first preset threshold is a maximum supply voltage of a device connected to the power supply unit, and the second preset threshold is a minimum supply voltage of the device connected to the power supply unit.

Based on the foregoing method, in a time period in which the first transformation unit is connected to the current detection unit, the processing unit calculates a valid current value on a detected cable by using a current value that is output by the current detection unit. In this case, an output voltage of the power supply unit falls within a working voltage range of the processing unit, to ensure normal working of the processing unit.

DESCRIPTION OF EMBODIMENTS

Figure 1:
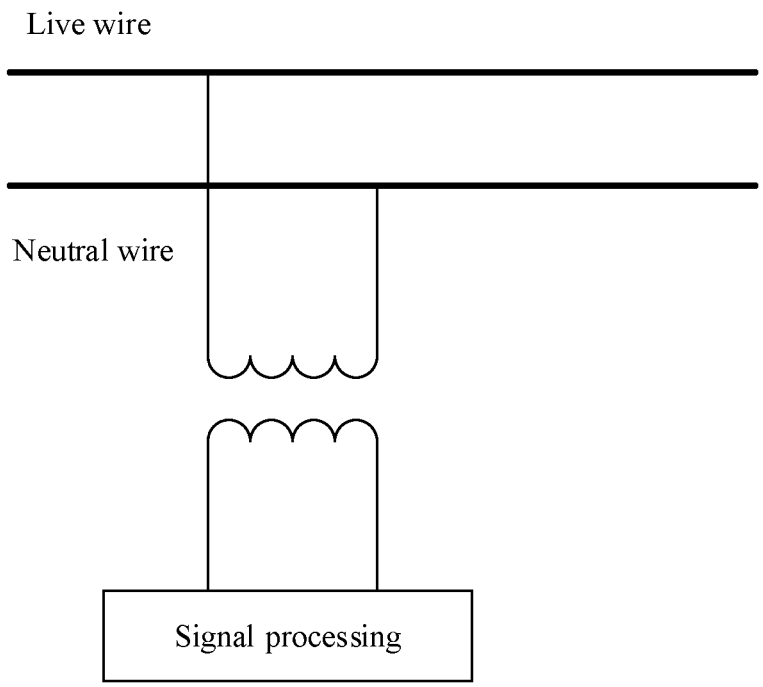
FIG. 1 is a schematic diagram 1 of a structure of a current detection apparatus according to an embodiment of this application.
Figure 2:
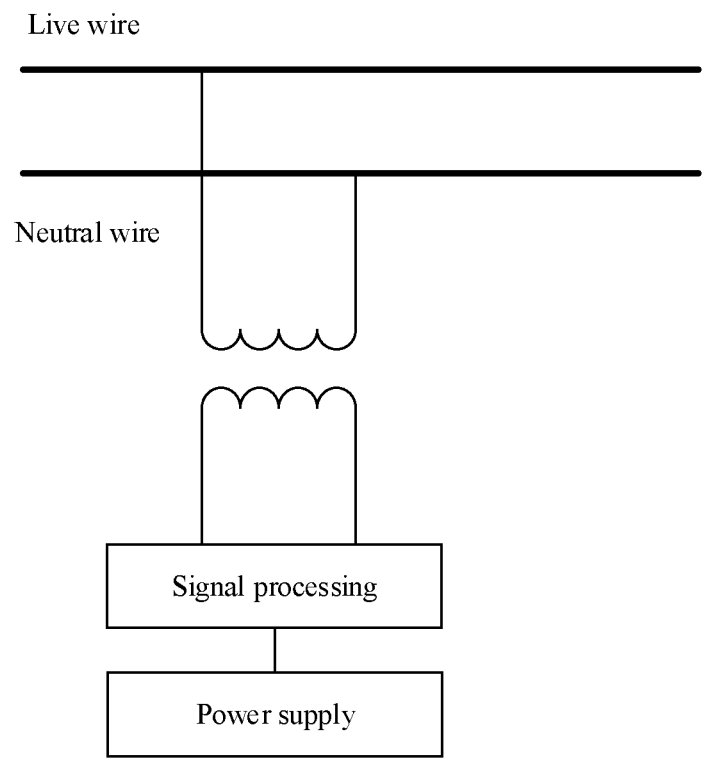
FIG. 2 is a schematic diagram 2 of a structure of a current detection apparatus according to an embodiment of this application.

To make objectives, technical solutions, and advantages of this application clearer, the following further describes this application in detail with reference to accompanying drawings. A current detection apparatus provided in embodiments of this application may be configured to detect a current flowing through a cable. The cable is applied to various types of power grids to transmit electric energy. The power grids may be a city power grid, a photovoltaic power grid, a micro power grid, a home power grid, an industrial power grid, and the like. The electric energy transmitted by the power grid may be a high-frequency alternating current or a low-frequency alternating current, or may be a high voltage or a low voltage. Electric energy transmitted on the cable is mainly determined by a specific type of the power grid. This is not excessively limited in embodiments of this application.

It should be noted that in descriptions of this application, "at least one" means one or more, and "a plurality of" means two or more. In view of this, in embodiments of this application, "a plurality of" may alternatively be understood as "at least two". A term "and/or" describes an association relationship between associated objects and indicates that three relationships may exist. For example, A and/or B may indicate the following cases: Only A exists, both A and B exist, and only B exists. In addition, a character "/" usually indicates an "or" relationship between the associated objects unless otherwise specified. In addition, it should be understood that, in the descriptions of this application, terms such as "first" and "second" are merely used for distinguishing and description, but should not be understood as indicating or implying relative importance, or should not be understood as indicating or implying a sequence.

It should be noted that a "connection" in embodiments of this application means an electrical connection, and a connection between two electrical elements may be a direct connection or an indirect connection between the two electrical elements. For example, a connection between A and B may represent that A is directly connected to B, or that A is indirectly connected to B by using one or more other electrical elements. For example, a connection between A and B may also represent that A is directly connected to C, that C is directly connected to B, and that A is connected to B through C.

It should be noted that a switch in embodiments of this application may be one or more of a plurality of types of switch devices, such as a relay, a metal-oxide-semiconductor field-effect transistor (MOSFET), a bipolar junction transistor (BJT), an insulated gate bipolar transistor (IGBT), or a silicon carbide (SiC) power transistor. The switch devices are not listed one by one in embodiments of this application. Each switch device may include a first electrode, a second electrode, and a control electrode. The control electrode is configured to control the switch device to be turned on or turned off. When the switch device is turned on, a current may be transmitted between the first electrode and the second electrode of the switch device. When the switch device is turned off, no current can be transmitted between the first electrode and the second electrode of the switch device. The MOSFET is used as an example. The control electrode of the switch device is a gate, the first electrode of the switch device may be a source of the switch device, and the second electrode may be a drain of the switch device. Alternatively, the first electrode may be a drain of the switch device, and the second electrode may be a source of the switch device.

The following first describes some terms used in embodiments of this application to help a person skilled in the art have a better understanding.

(1) Production compliance level. Production compliance is a requirement on product security in product certification, including a requirement on security of a product part and a requirement on security of a finished product. Potential hazards such as an electric shock, fire, a mechanical damage, a heat damage, a chemical damage, a radiation damage, and food hygiene that may occur during normal or abnormal use are evaluated by simulating a use method and conducting a series of tests.

(2) Capacitive coupling, also known as electric field coupling or electrostatic coupling, is a coupling manner generated due to existence of distributed capacitance. Specifically, in a direct-current circuit, a capacitor is equivalent to an open circuit that no current can pass through. However, in an alternating-current circuit, as a voltage of a pin of a capacitor gradually increases, charges accumulated on an electrode plate connected to the pin also gradually increase. As the voltage gradually decreases, the charges accumulated on the corresponding electrode plate also gradually decrease. In an entire process, no current actually passes through the capacitor, but it seems that a current passes through the capacitor. Therefore, a coupling capacitor in the alternating-current circuit may approximately complete current transfer from a previous stage to a next stage in such a manner.

To facilitate understanding of a current detection apparatus provided in an embodiment of this application, an application scenario of the current detection apparatus is first described below. The current detection apparatus may detect an actual current on a detected cable, and obtain, through calculation, a valid current value transmitted by the cable. Generally, an existing current detection apparatus performs measurement by using an electrical connection point that is directly led out of the detected cable. After the electrical connection point is led out, the detected cable may be connected to a voltage divider resistor circuit for voltage division and step-down, and signal processing is performed on an electrical signal on the voltage divider resistor. Alternatively, after the electrical connection point is led out, the detected cable is connected to a step-down transformer; and after the step-down transformer steps down a voltage, signal processing is performed, a current value of an alternating current on the detected cable is finally obtained, and a dedicated power supply needs to be configured to supply power to the current detection apparatus.

However, in the foregoing manner of performing detection by leading out the electrical connection point, when the current detection apparatus performs current detection, a detection location is limited by the electrical connection point disposed on the detected cable. In addition, after the electrical connection point is disposed, production compliance and insulation of the cable and a distance relationship between the electrical connection point and the power supply of the current detection apparatus further need to be considered. In addition, in the manner of performing detection by leading out the electrical connection point, the voltage divider resistor circuit or the step-down transformer is inevitably disposed to reduce the current on the detected cable for ease of detection. Therefore, the voltage divider resistor circuit or the step-down transformer further increases a volume and costs of the current detection apparatus, thereby bringing inconvenience to detection personnel.

Figure 3:
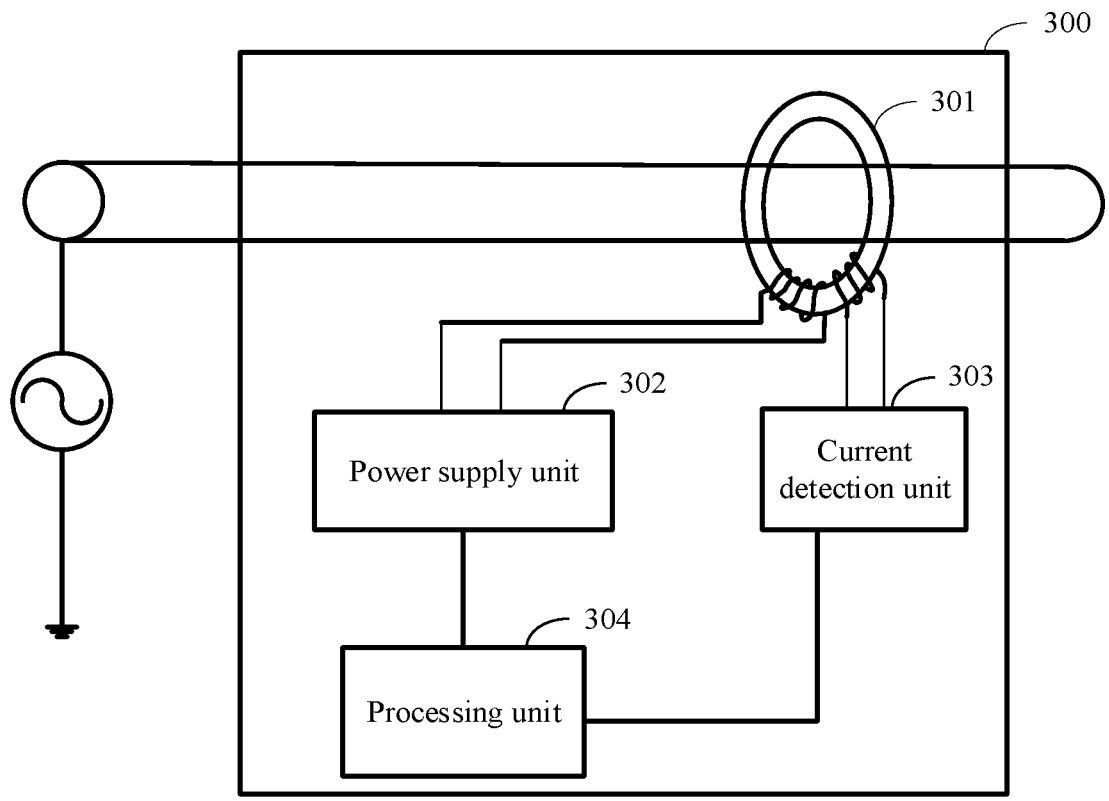
FIG. 3 is a schematic diagram 3 of a structure of a current detection apparatus according to an embodiment of this application.

In view of this, to further improve the current detection apparatus and reduce costs, the current detection apparatus is simplified, so that the detection personnel can detect the alternating current in a non-contact electrical connection manner. In the following embodiment, an example of detecting a detected cable that transmits a single-phase alternating current is used for description. However, a current detection apparatus described in the following embodiment may also be applicable to detection of a three-phase current. In the foregoing scenario, a method for using a current detection apparatus is only a simple combination in a single-phase scenario, and details are not described herein. FIG. 3 shows a current detection apparatus. The current detection apparatus 300 includes a first transformation unit 301, a power supply unit 302, a current detection unit 303, and a processing unit 304.

The following describes a function of each unit in a process in which the apparatus detects a current flowing through a detected cable.

The first transformation unit 301 includes a hollow part, the detected cable passes through the hollow part, and the first transformation unit 301 is configured to generate a first induction electrical parameter and a second induction electrical parameter based on an actual current flowing through the detected cable. The power supply unit 302 is connected to the first transformation unit 301, and is configured to: convert a voltage in the first induction electrical parameter into a first voltage, and transmit the first voltage to the processing unit 304 to supply power to the processing unit 304. The current detection unit 303 is connected to the first transformation unit 301, and is configured to: receive the second induction electrical parameter, convert a current in the second induction electrical parameter into a second voltage, and transmit the second voltage to the processing unit 304.

The processing unit 304 is separately connected to the power supply unit 302 and the current detection unit 303, and is configured to calculate a current value on the detected cable based on the second voltage that is output by the current detection unit 303. An induction electrical parameter may include a current and a voltage.

The first transformation unit 301 may specifically generate, by using the actual current flowing through the detected cable, the induction electrical parameter used by a subsequent device to perform current measurement. The induction electrical parameter is obtained by using the transformation unit, instead of being directly led out from the detected cable, thereby eliminating a limitation imposed by an electrical connection point on an installation location of the current detection apparatus 300, and increasing a production compliance level of the current detection apparatus 300 very well. For a specific current detection manner, refer to content described in the following embodiment.

Specifically, the first transformation unit 301 may include an open measuring type current transformer (CT). The current transformer includes a hollow part, and the detected cable passes through the hollow part. The current transformer is an instrument that converts, according to an electromagnetic induction principle, a high current flowing through the detected cable into a low current for measurement. The current transformer includes a ring-shaped magnetic core and a winding wound around the ring-shaped magnetic core. The ring-shaped magnetic core is equivalent to a primary side winding of the current transformer, and the winding wound around the ring-shaped magnetic core is a secondary side winding of the current transformer. A corresponding induction electrical parameter is generated on the secondary side winding of the current transformer according to the electromagnetic induction principle. Specifically, when the current flows through the detected cable, a magnetic field is generated around the detected cable. The magnetic field causes a change in a magnetic field in the ring-shaped magnetic core, and the first induction electrical parameter and the second induction electrical parameter are generated on the winding wound around the ring-shaped magnetic core.

Figure 4:
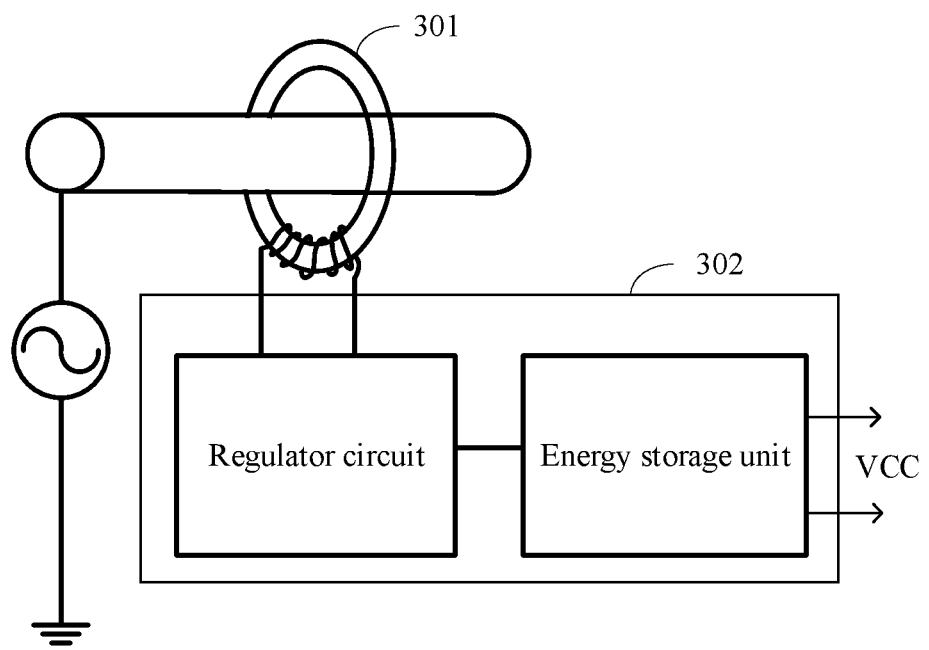
FIG. 4 is a schematic diagram of a structure of a power supply unit according to an embodiment of this application.

As shown in FIG. 4, the power supply unit 302 includes a regulator circuit and an energy storage unit. Because a single-phase alternating current flows through the detected cable, an amplitude of a voltage and an amplitude of a current in the single-phase alternating current both change with time. To ensure power supply stability, the regulator circuit may convert a voltage whose amplitude changes in the first induction electrical parameter into a first voltage whose amplitude basically remains unchanged, and output the first voltage to the processing unit.

During specific implementation, the energy storage unit may include one or more capacitors connected in parallel.

It should be understood that, in a process in which the power supply unit 302 provided in this embodiment of this application is configured to supply power to the processing unit 304 and another load, as electric energy of the processing unit 304 is consumed, an input voltage of the regulator circuit gradually deviates from a working voltage range of the processing unit 304. To ensure normal working of the processing unit to a maximum extent, the energy storage unit is connected between the regulator circuit and the processing unit, and the energy storage unit may store the first voltage that is output by the regulator circuit, to ensure that a voltage that is output by the energy storage unit keeps stable at the first voltage for a long time. Therefore, the voltage that is output is effectively prevented from rapidly decreasing in a process of supplying power to a device connected to a backend of the power supply unit.

It should be understood that, because the single-phase alternating current flows through the detected cable, the voltage that is in the first induction electrical parameter and that is received by the power supply unit 302 is an alternating current voltage, and the device connected to the backend of the power supply unit 302 is a direct current power supply device in most cases. Therefore, the power supply unit 302 may further include an alternating current (AC)-to-direct current (DC) converter (AC/DC converter) connected between the regulator circuit and the first transformation unit 301. The AC/DC converter may be configured to: convert the alternating current voltage in the first induction electrical parameter into a direct current voltage, and output the direct current voltage to the regulator circuit.

Figure 5:
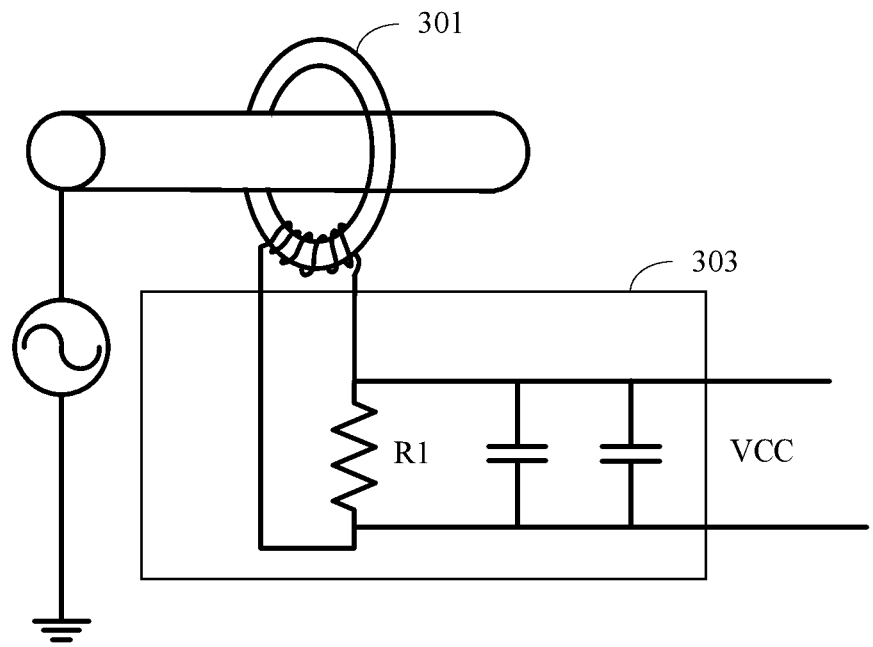
FIG. 5 is a schematic diagram of a structure of a current detection apparatus according to an embodiment of this application.

As shown in FIG. 5, the current detection unit 303 includes a first resistor R1 and a current sampling circuit. When the current in the second induction electrical parameter flows through the first resistor R1, a corresponding voltage is generated at two ends of the first resistor R1. The current sampling circuit samples the voltage at the two ends of the first resistor R1, and outputs the sampled voltage to the processing unit 304.

The processing unit 304 may be a processor or a controller, for example, may be a general-purpose central processing unit (CPU), a general-purpose processor, a digital signal processor (DSP), an application-specific integrated circuit (ASIC), a field-programmable gate array (FPGA) or another programmable logic device, a transistor logic device, a hardware component, or any combination thereof. The processing unit 304 may implement or execute various example logical blocks, modules, and circuits described with reference to content disclosed in this application. The foregoing processing unit 304 may alternatively be a combination implementing a computing function, such as a combination including one or more microprocessors, or a combination of a DSP and a microprocessor. In addition, the processing unit 304 may further include an ADC, configured to convert an analog parameter that is input by the current detection unit 303 into a digital parameter.

After receiving the voltage that is output by the current detection unit 303, the processing unit 304 may determine, by using the ADC, a valid value of the voltage that is output by the current detection unit 303, and perform an ohmic operation by using a resistance value of the first resistor R1, to obtain the current value on the detected cable. When the current detection unit 303 performs current detection, a sampled current and the actual current on the detected cable are reduced by a ratio (a ratio of a quantity of coil turns of the primary side winding to a quantity of coil turns of the secondary side winding of the current transformer). Therefore, after the second voltage is output, the processing unit 304 amplifies the current value by a cable current amplification factor by using the current value obtained through the ohmic operation, so that an actual current value on the detected cable can be obtained.

Figure 6:
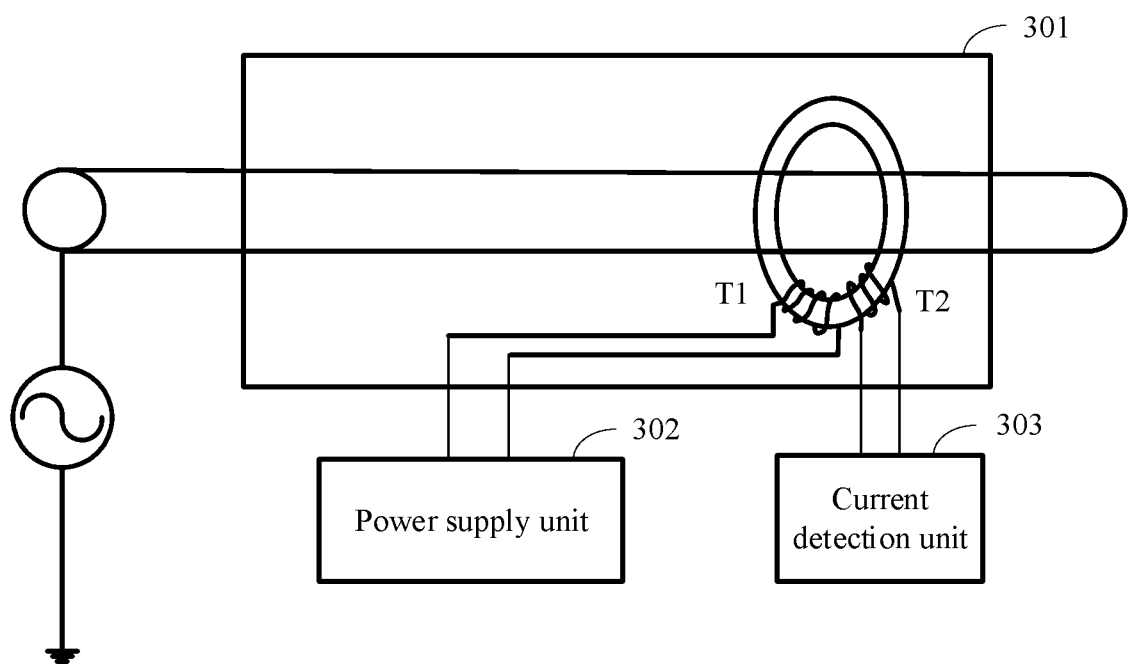
FIG. 6 is a schematic diagram of a structure of a first transformation unit according to an embodiment of this application.

In a possible implementation, FIG. 6 is a schematic diagram of a structure of a first transformation unit 301. The first transformation unit 301 includes: a ring-shaped magnetic core, and a first winding T1 and a second winding T2 that are wound around the ring-shaped magnetic core. The detected cable passes through a hollow part of the ring-shaped magnetic core, two endpoints of the first winding form a first input port of the first transformation unit, and two endpoints of the second winding form a second output port of the first transformation unit.

In a possible implementation, the ring-shaped magnetic core is of a closed or non-closed ring-shaped hollow structure. The ring-shaped magnetic core is made of a metal material, and the metal material may be copper, aluminum, or the like. The detected cable passes through the hollow part of the ring-shaped magnetic core, and the ring-shaped magnetic core is configured to: generate a first induction electrical parameter on the first winding and a second induced voltage on the second winding based on an actual current on the detected cable.

A connection relationship between devices in the first transformation unit 301 shown in FIG. 6 may be as follows: The detected cable passes through the hollow part of the ring-shaped magnetic core, the two endpoints of the first winding T1 are connected to two input ports of the power supply unit 302, and the two endpoints of the second winding T2 are connected to two input ports of the current detection unit 303.

When the first transformation unit 301 shown in FIG. 6 is configured to generate the first induction electrical parameter and the second induction electrical parameter, an electromagnetic field is generated around the detected cable. When the detected cable passes through the hollow part of the ring-shaped magnetic core, a magnetic flux in the ring-shaped magnetic core is caused to change. A change in the magnetic flux causes the first induction electrical parameter to be generated on the first winding T1, and the second induction electrical parameter to be generated on the second winding T2. The first winding T1 outputs the generated first induction electrical parameter to the power supply unit 302, and the second winding T2 outputs the generated second induction electrical parameter to the current detection unit 303.

It should be noted that, because the first winding T1 and the second winding T2 in the first transformation unit 301 share one magnetic core, if the first winding T1 and the second winding T2 are both in a closed state to generate the induction electrical parameters, because a self-excitement phenomenon exists between the two windings, accuracy of a calculation result cannot be ensured when the current detection unit connected to a backend of the second winding T2 calculates current by using the second induction electrical parameter.

In view of this, a switch unit 305 is disposed between the first winding T1 and the power supply unit 302 and between the second winding T2 and the current detection unit 303. The switch unit 305 is configured to: connect the first winding T1 to the power supply unit 302, and connect the second winding T2 to the current detection unit 303. The switch unit 305 may be configured to enable the first winding T1 and the second winding T2 to be complementarily closed, so that impact, on detection of the generated induction electrical parameters, of self-excitation generated when the windings are both closed is effectively avoided.

Figure 7:
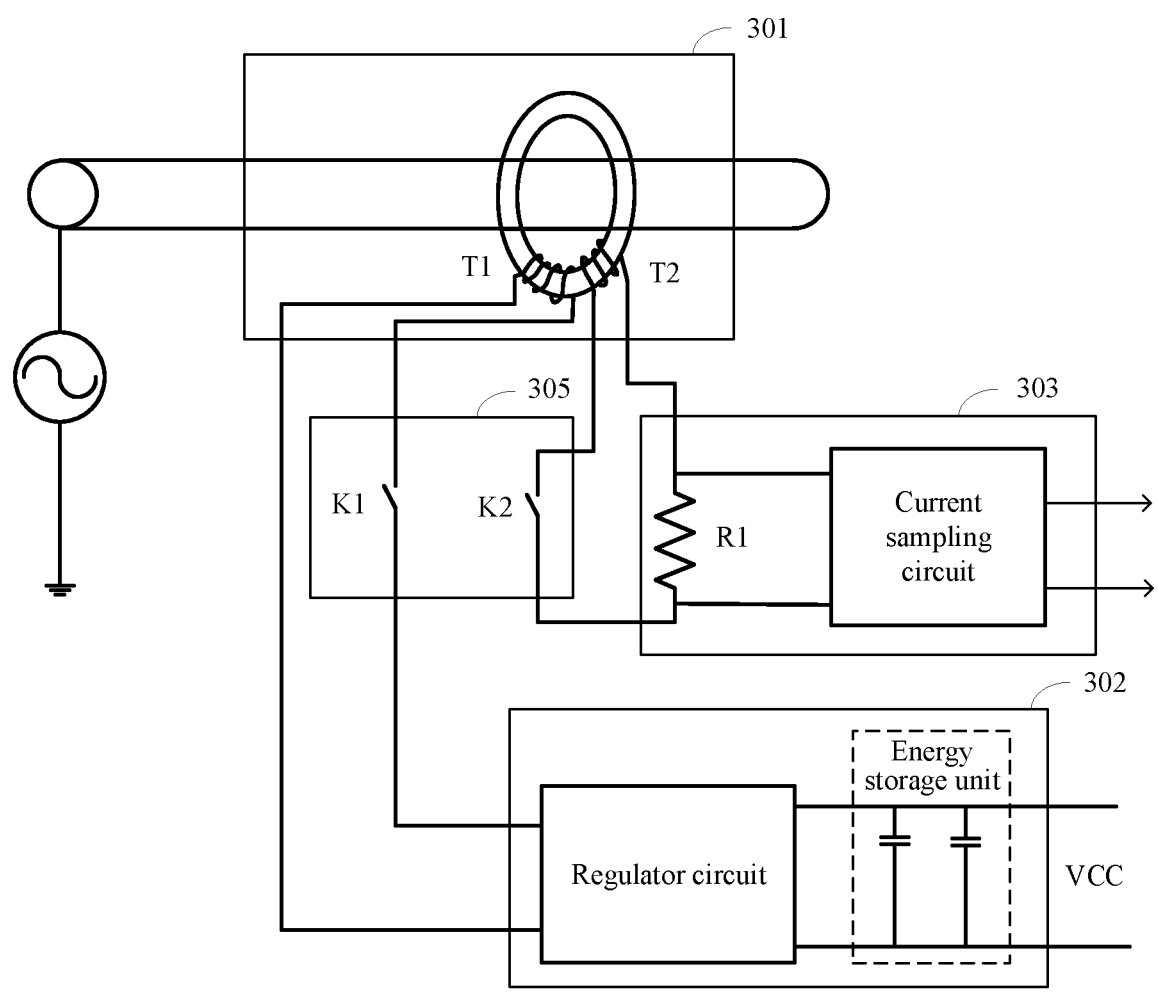
FIG. 7 is a schematic diagram of a structure of a switch unit according to an embodiment of this application.

Specifically, the switch unit 305 may include a first switch K1 and a second switch K2. As shown in FIG. 7, the first switch K1 is connected between the first winding T1 in the first transformation unit 301 and the power supply unit 302. The second switch K2 is connected between the second winding T2 in the first transformation unit 301 and the current detection unit 303.

Specifically, a first electrode of the first switch K1 is connected to a first endpoint of the first winding, and a second electrode of the first switch K1 is connected to a first endpoint on an input side of the power supply unit 302. A first electrode of the second switch K2 is connected to a second endpoint of the second winding, and a second electrode of the second switch K2 is connected to a second endpoint on an input side of the current detection unit 303. The first endpoint may be an end at which a device transmits a high-level voltage.

In a possible implementation, the current detection apparatus 300 may further include a controller connected to the switch unit.

During actual use, the switch unit 305 and the controller configured to control a working status of the switch unit 305 are both connected to the power supply unit 302, and the power supply unit 302 may supply power to the switch unit 305 and the controller.

Figure 8:
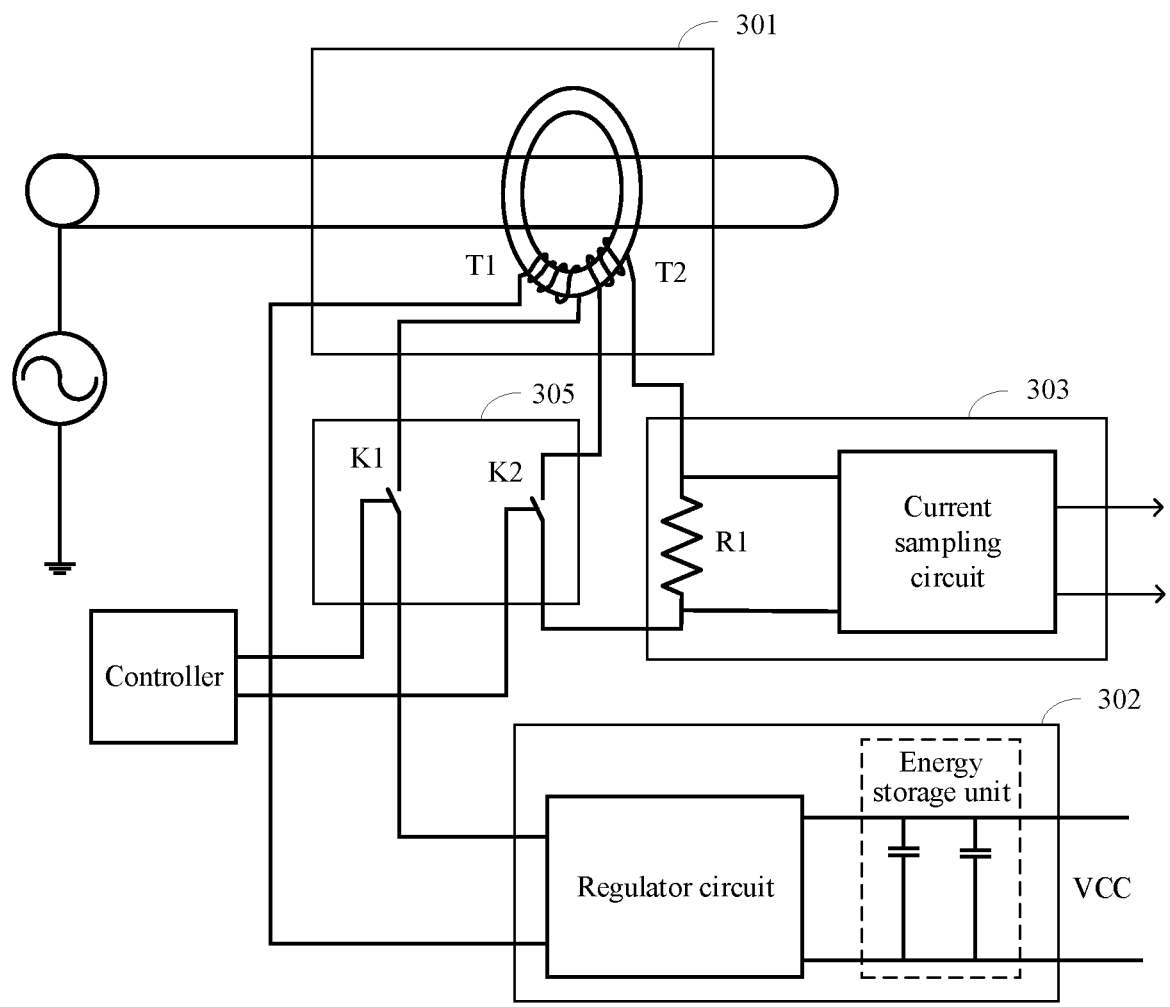
FIG. 8 is a schematic diagram of a connection of a controller according to an embodiment of this application.

Specifically, as shown in FIG. 8, the controller is separately connected to a control electrode of the first switch K1 and a control electrode of K2, and is configured to control the first switch and the second switch to be turned off and turned on.

Figure 9:
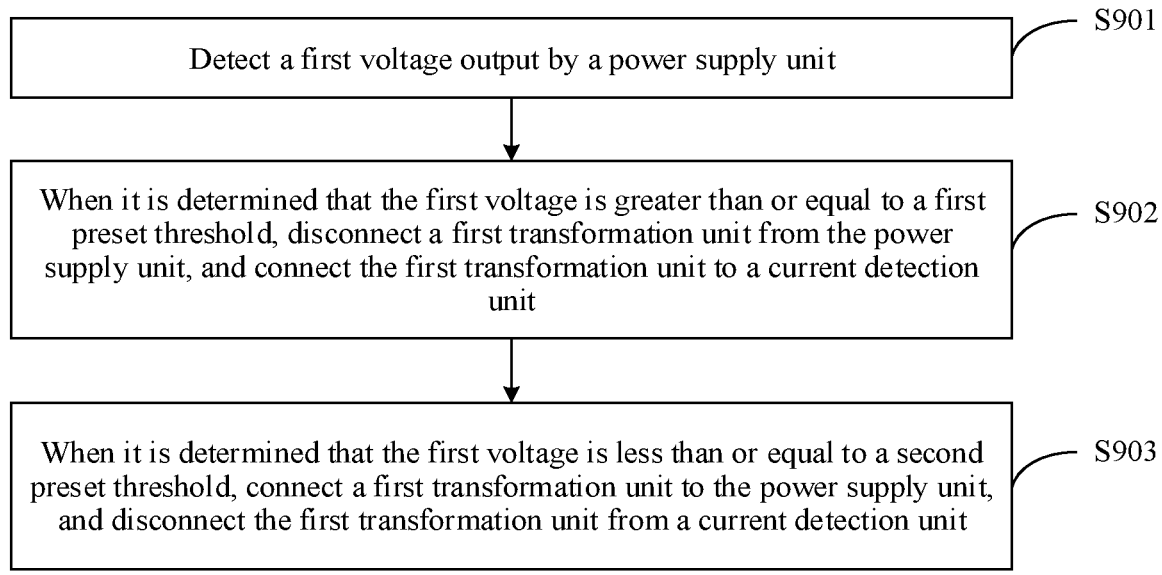
FIG. 9 is a schematic flowchart of a method for controlling a current detection apparatus according to an embodiment of this application.

In conclusion, as shown in a flowchart shown in FIG. 9, a method for controlling a status of a device in a switch unit by using the foregoing controller in an embodiment of this application mainly includes the following steps:

S901: Detect a first voltage that is output by a power supply unit.

S902: When it is determined that the first voltage is greater than or equal to a first preset threshold, disconnect a first transformation unit from the power supply unit, and connect the first transformation unit to a current detection unit, where the first preset threshold may be a maximum working voltage of a device connected to the power supply unit.

During actual use, a first control signal is sent to a first switch connected between the power supply unit and the first transformation unit, and a second control signal is sent to a second switch connected between the current detection unit and the first transformation unit. The first control signal is used to control the first switch to be turned on, and the second control signal is used to control the second switch to be turned off.

In an example, to ensure that the device connected to the power supply unit works normally, the first preset threshold may be less than the maximum working voltage.

S903: When it is determined that the first voltage is less than or equal to a second preset threshold, connect a first transformation unit to the power supply unit, and disconnect the first transformation unit from a current detection unit, where the second preset threshold may be a minimum working voltage of a device connected to the power supply unit.

During actual use, a third control signal is sent to a first switch connected between the power supply unit and the first transformation unit, and a fourth control signal is sent to a second switch connected between the current detection unit and the first transformation unit. The third control signal is used to control the first switch to be turned off, and the fourth control signal is used to control the second switch to be turned on.

Figure 10:
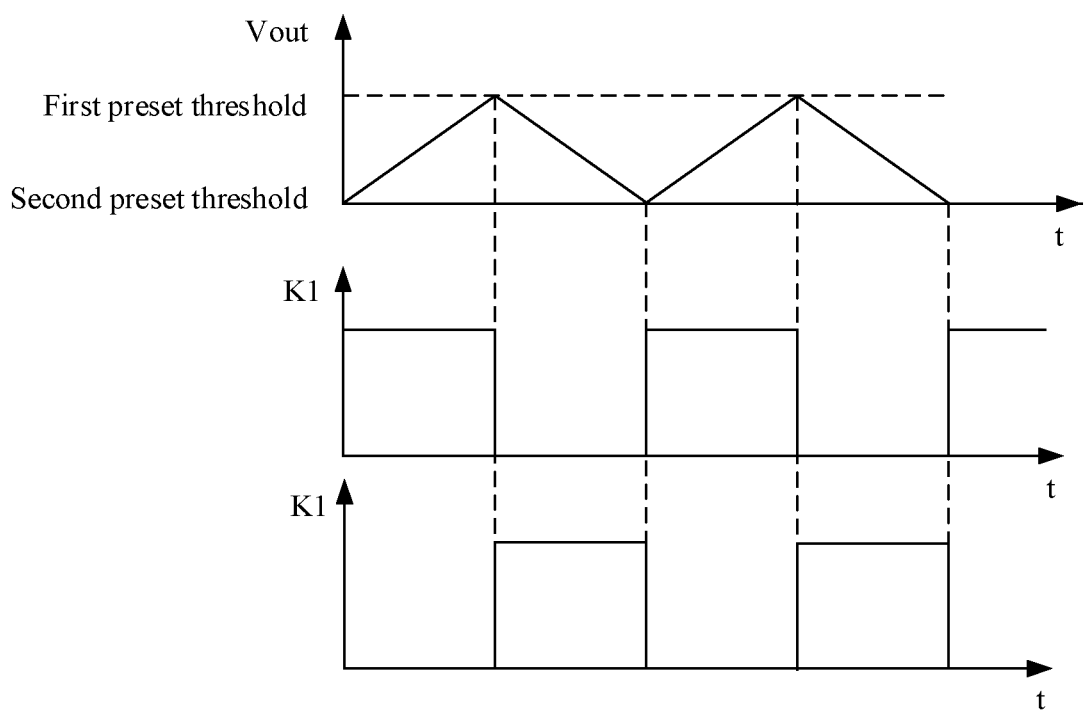
FIG. 10 is a schematic diagram of a voltage waveform of an output voltage of a power supply unit according to an embodiment of this application.

Specifically, when the working statuses of the switches K1 and K2 in the switch unit provided in this embodiment of this application are controlled by using a method for controlling a current detection apparatus provided in this embodiment of this application, a waveform of an output voltage (Vout) of the power supply unit may be shown in FIG. 10. It can be learned from FIG. 10 that the output voltage of the power supply unit always falls within a working voltage range of the processing unit.

Figure 11:
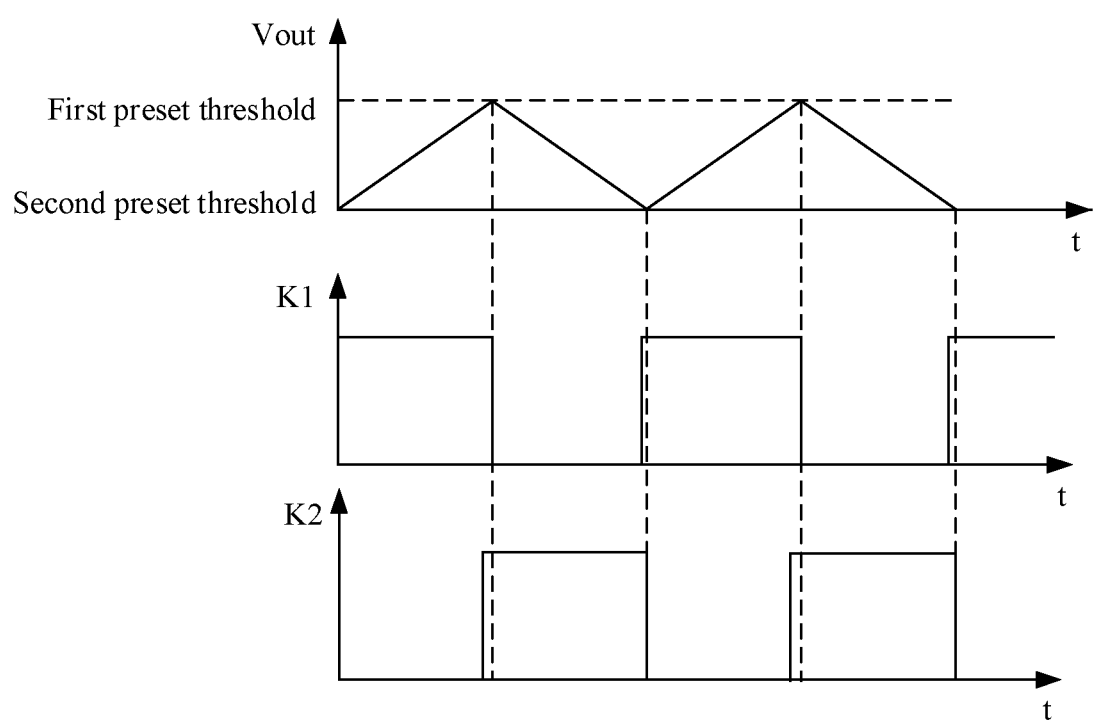
FIG. 11 is a schematic diagram of a working status of a first switch and a working status of a second switch according to an embodiment of this application.

During actual use, switching moments of the two switches K1 and K2 may be delayed, to prevent the two switches from being both turned off and therefore avoid damage caused by a high voltage to the two switches or the power supply unit and the current detection unit that are connected to the two switches. Specifically, the working statuses of the switches K1 and K2 may be shown in FIG. 11.

It can be learned from the foregoing embodiment that, based on the current detection apparatus 300 provided in this embodiment of this application, the controller 405 may configure a turn-on moment of the first switch and a turn-on moment of the second switch in the switch unit based on an input voltage of the power supply unit. It can be learned with reference to the foregoing content that, when the output voltage of the power supply unit exceeds the first preset threshold, the first switch is controlled to be turned off and the second switch is controlled to be turned on to perform current detection; or when the output voltage of the power supply unit is less than the second preset threshold, the first switch is controlled to be turned on and the second switch is controlled to be turned off to store electric energy for the power supply unit, that is, the output voltage of the power supply unit falls within a range between the first preset threshold and the second preset threshold. Therefore, using the control method shown in FIG. 9 in this embodiment of this application is beneficial to ensuring that power supply to the processing unit is performed within a rated working voltage range while accuracy of a current detection result is ensured.

Figure 12:
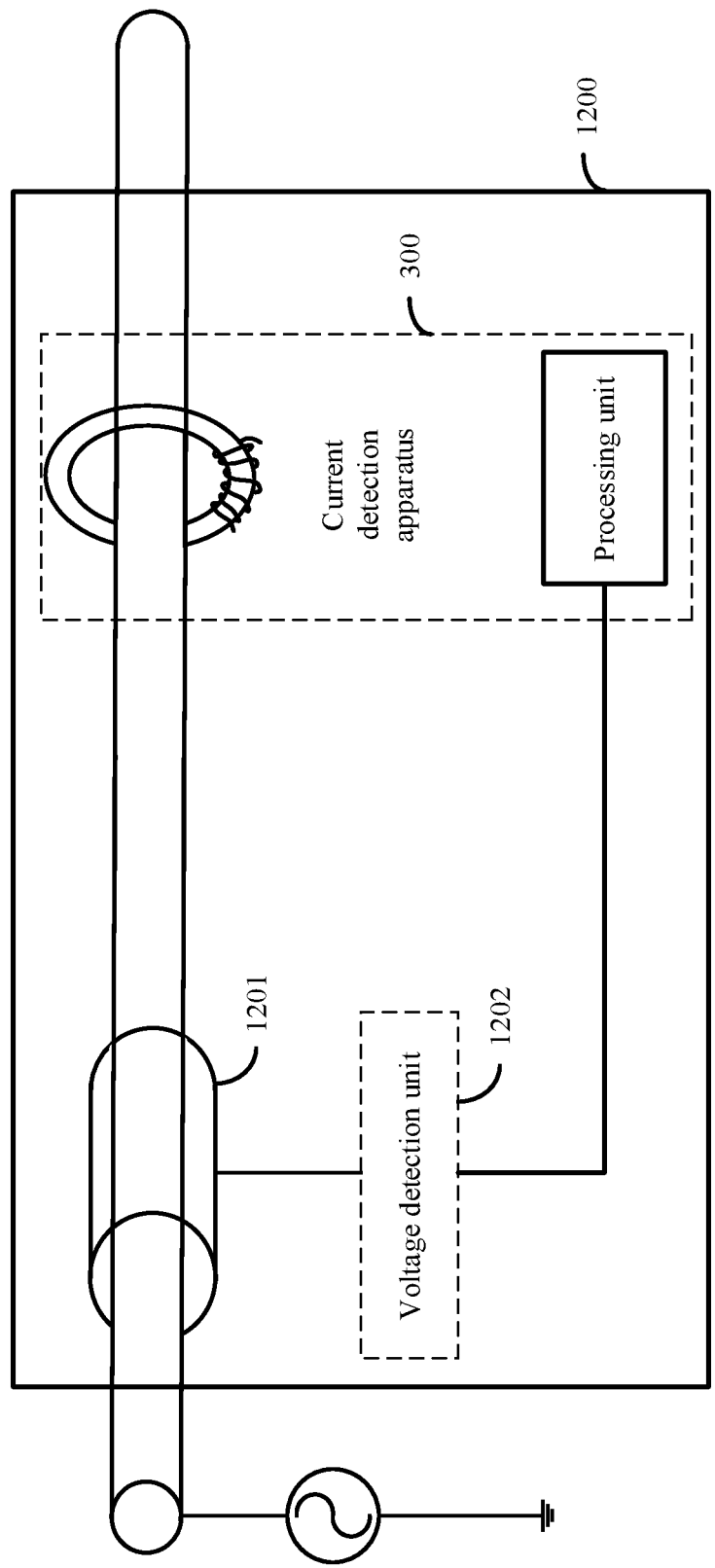
FIG. 12 is a schematic diagram of a structure of an electric energy detection apparatus according to an embodiment of this application.

Based on a same technical concept, this application further provides an electric energy detection apparatus. As shown in FIG. 12, an alternating current voltage detection apparatus 1200 includes a second transformation unit 1201, a voltage detection unit 1202, and the foregoing current detection apparatus 300.

The second transformation unit 1201 is located in a hollow part of a first transformation unit in the current detection apparatus 300, and is configured to generate a third induced voltage based on an actual voltage of a detected cable. The voltage detection unit 1202 is separately connected to a power supply unit in the current detection apparatus 300 and the second transformation unit 1201, and is configured to: convert the third induced voltage into a third voltage and output the third voltage to a processing unit in the current detection apparatus 300. The current detection apparatus 300 is coupled to the detected cable, and is configured to: detect a current value on the detected cable, and calculate, based on the third voltage and the current value on the detected cable, electric energy transmitted on the detected cable.

Figure 13:
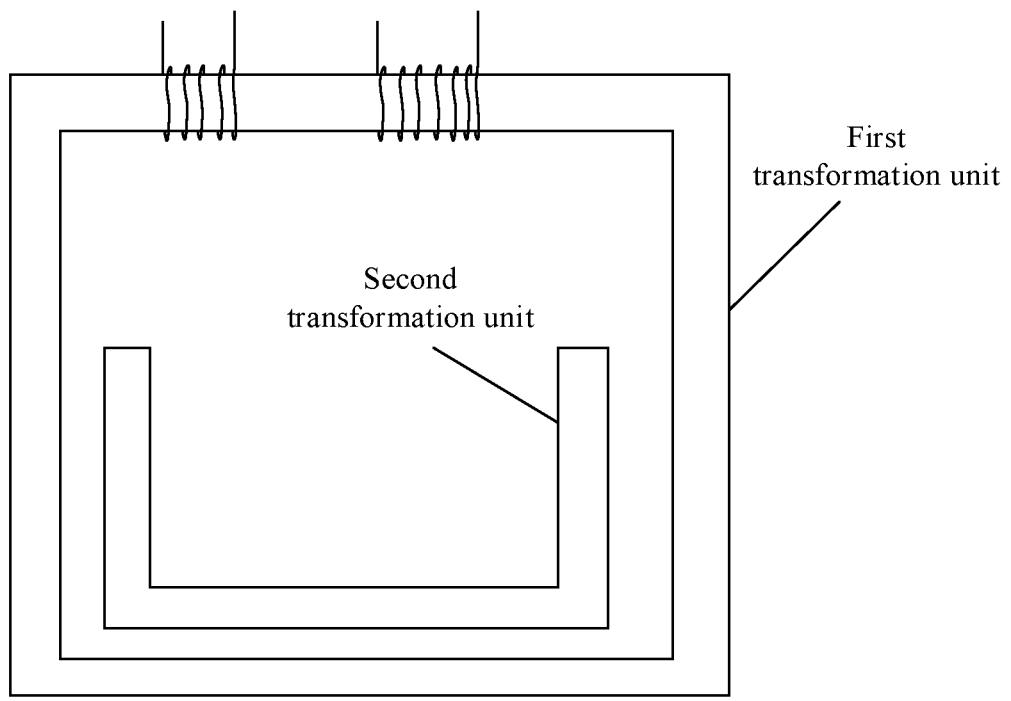
FIG. 13 is a schematic diagram of a structure of a second transformation unit according to an embodiment of this application.

Specifically, the second transformation unit is of a closed or non-closed magnetic core structure. FIG. 13 is a schematic diagram of a structure of a second transformation unit. The second transformation unit is connected in the hollow part of the first transformation unit in the current detection apparatus, to reduce a volume of an electric energy detection apparatus.

In a possible implementation, the second transformation unit may be a voltage transformer. The voltage transformer is configured to generate the third induced voltage based on the actual voltage on the detected cable and coupling capacitance.

Figure 14:
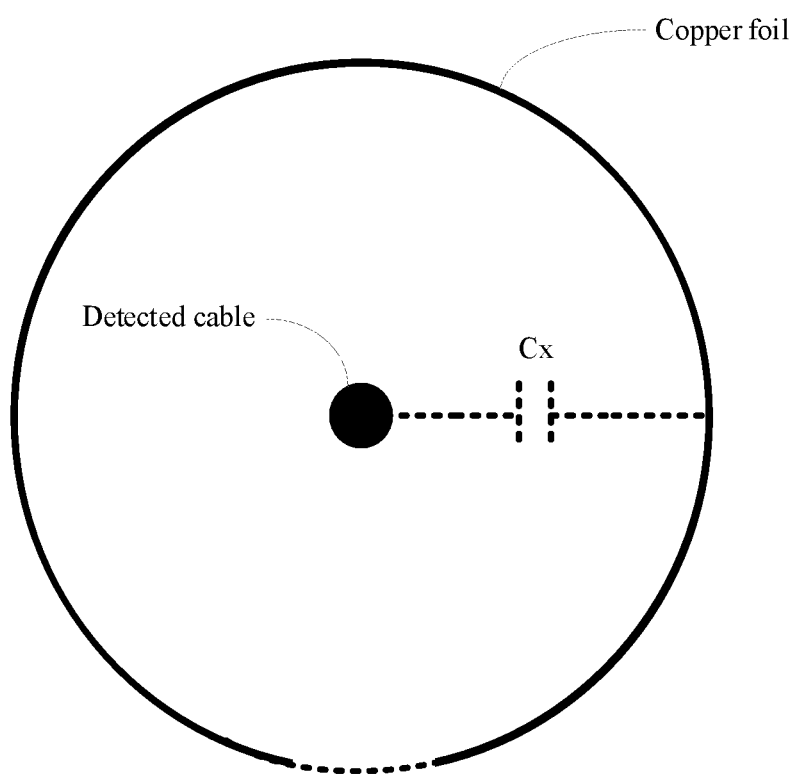
FIG. 14 is a schematic diagram of a structure of a voltage transformer according to an embodiment of this application.

In a possible implementation, a voltage sensor is of a conductive cylindrical structure, the detected cable passes through the voltage sensor, the voltage sensor and the detected cable form the coupling capacitance, and the voltage sensor is of a closed or non-closed cylindrical structure. The voltage sensor is made of a metal material. FIG. 14 is a schematic diagram of a structure of a voltage sensor. The voltage sensor is a foil made of a copper material, and the copper foil may be coiled in a closed or non-closed manner. After the copper foil is sleeved outside the detected cable, the coupling capacitance is generated between the detected cable and the copper foil $C_x$.

The voltage sensor may alternatively be of a cylindrical structure different from that shown in FIG. 14, or may be a polygonal cylindrical structure, such as a square cylindrical structure or a rectangular cylindrical structure. In addition, the voltage sensor may alternatively be of a non-cylindrical metal bipolar plate structure. Specifically, a metal bipolar plate may be disposed on two sides of the detected cable, so that the detected cable passes through the metal bipolar plate, thereby forming the coupling capacitance $C_x$ with the detected cable.

After the voltage sensor and the detected cable form the coupling capacitance $C_x$, an alternating current voltage on the detected cable and the coupling capacitance are coupled by using a capacitor, so that the third induced voltage can be formed and input to the voltage detection unit 1202.

Figure 15:
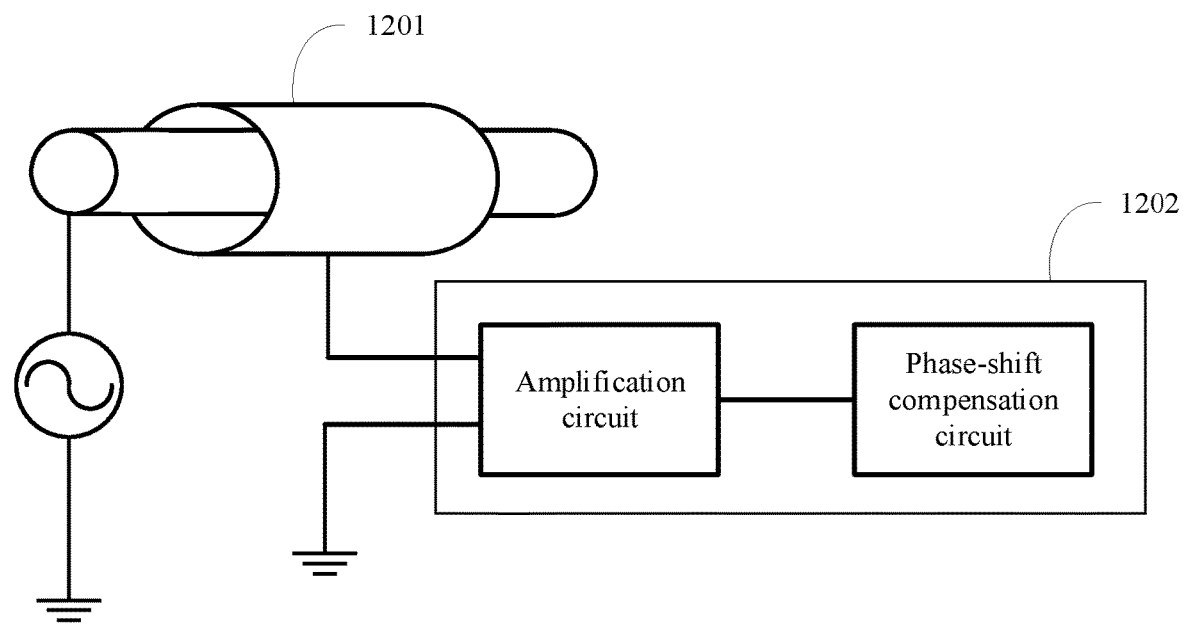
FIG. 15 is a schematic diagram of a structure of a voltage detection unit according to an embodiment of this application.

In a possible implementation, as shown in FIG. 15, the voltage detection unit 1202 includes: an amplification circuit and a phase-shift compensation circuit. The amplification circuit includes a first input port, a second input port, and a first output port. The first input port is connected to a voltage sensor, the second input port is connected to a ground cable, and the first output port is connected to the phase-shift compensation circuit.

Specifically, the amplification circuit is configured to: amplify the third induced voltage by a first factor, and output a fourth voltage to the phase-shift compensation circuit through the output port. The phase-shift compensation circuit is configured to: perform phase shift on the fourth voltage, amplify the fourth voltage by a second factor, and output the third voltage.

Figure 16:
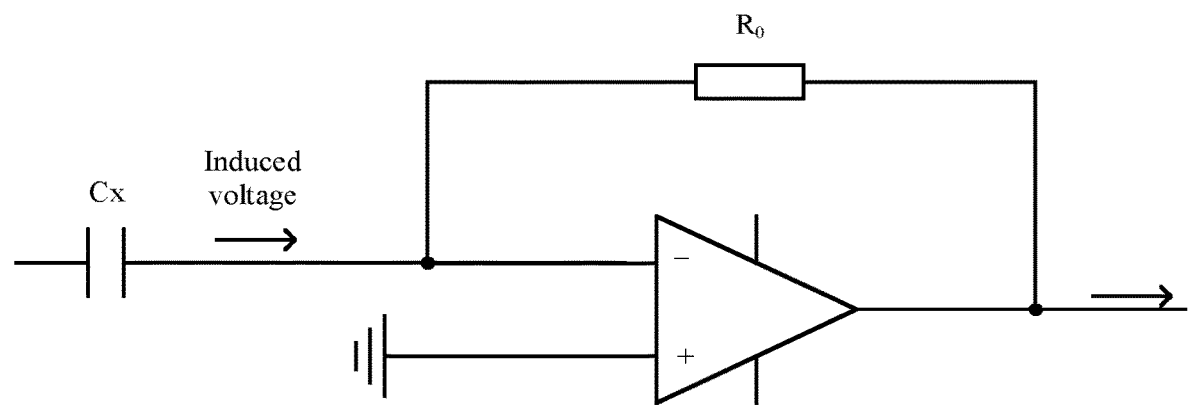
FIG. 16 is a schematic diagram of a structure of a reverse amplification circuit according to an embodiment of this application.

During actual use, the third induced voltage is excessively small, and is difficult to be identified and detected by an ADC in the processing unit in the current detection apparatus 300. Therefore, the induced voltage needs to be amplified by the amplification circuit. Therefore, the amplification circuit may be, but is not limited to, a reverse amplification circuit, a differential amplification circuit, or the like. Herein, the reverse amplification circuit is used as an example. FIG. 16 is a schematic diagram of a structure of a reverse amplification circuit. A first factor by which the reverse amplification circuit performs amplification is related to feedback resistance $R_0$ in the reverse amplification circuit. A larger feedback resistance $R_0$ indicates a larger amplification factor. This should be known by a person skilled in the art and is not described herein.

In a possible implementation, the phase-shift compensation circuit is specifically configured to enable a phase of the fourth voltage to lag behind by 90°.

The foregoing is described from a perspective of the method embodiment. It may be understood that, to implement the foregoing method, the apparatus for performing the method for controlling a current detection apparatus may include a corresponding hardware structure and/or software module for executing each function. A person skilled in the art may be easily aware that, in combination with the units and algorithm steps of the examples described in the embodiments disclosed in this specification, this application can be implemented by hardware or a combination of hardware and computer software. Whether a function is executed by hardware or hardware driven by computer software depends on particular applications and design constraints of the technical solutions. A person skilled in the art may use different methods to implement the described functions for each particular application, but it should not be considered that the implementation goes beyond the scope of this application.

Based on the foregoing embodiments, an embodiment of this application further provides a computer program. When the computer program is run on a computer, the computer is enabled to perform a method for detecting alternating current electric energy provided in the foregoing embodiment, or the computer is enabled to perform the method for controlling a current detection apparatus provided in the foregoing embodiment.

Based on the foregoing embodiment, an embodiment of this application further provides a computer-readable storage medium. The computer-readable storage medium stores a computer program, and when the computer program is executed by a computer, the computer is enabled to perform the method for controlling a current detection apparatus provided in the foregoing embodiment.

The storage medium may be any usable medium that can be accessed by the computer. The following provides an example but does not impose a limitation: The computer-readable medium may include a random-access memory (RAM), a read-only memory (ROM), an electrically erasable programmable ROM (EEPROM), a compact disc ROM (CD-ROM) or another optical disc storage, a magnetic disk storage medium or another magnetic storage device, or any other medium that can be used for carrying or storing expected program code in a form of instructions or a data structure and that can be accessed by the computer.

Based on the foregoing embodiments, an embodiment of this application further provides a chip. The chip is configured to read a computer program stored in a memory, to implement the method for controlling a current detection apparatus provided in the foregoing embodiment.

Based on the foregoing embodiments, an embodiment of this application further provides a chip system. The chip system includes a processor, configured to support a computer apparatus in implementing the method for controlling a current detection apparatus provided in the foregoing embodiment. In a possible design, the chip system further includes a memory, and the memory is configured to store a program and data that are necessary for the computer apparatus. The chip system may include a chip, or may include a chip and another discrete device.

All or some of the foregoing embodiments may be implemented by software, hardware, firmware, or any combination thereof. When software is used to implement the foregoing embodiments, all or some of the foregoing embodiments may be implemented in a form of a computer program product. The computer program product includes one or more computer instructions. When a computer program instruction is loaded and executed on a computer, all or some of the procedures or functions according to embodiments of this application are generated. The computer may be a general-purpose computer, a dedicated computer, a computer network, or another programmable apparatus. The computer instructions may be stored in a computer-readable storage medium, or transmitted from one computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, a digital versatile disc (DVD)), a semiconductor medium (for example, a solid-state disk (SSD)), or the like.

The various illustrative logical units and circuits described in embodiments of this application may implement or operate the described functions by using a general-purpose processor, a digital signal processor, an ASIC, an FPGA or another programmable logical apparatus, a discrete gate or transistor logic, a discrete hardware component, or a design of any combination thereof. The general-purpose processor may be a microprocessor. Optionally, the general-purpose processor may alternatively be any conventional processor, controller, microcontroller, or state machine. The processor may alternatively be implemented by using a combination of computing apparatuses, such as a digital signal processor and a microprocessor, a plurality of microprocessors, one or more microprocessors in combination with a digital signal processor core, or any other similar configuration.

Steps of the methods or algorithms described in embodiments of this application may be directly embedded into hardware, a software unit executed by a processor, or a combination thereof. The software unit may be stored in a RAM memory, a flash memory, a ROM memory, an EPROM memory, an EEPROM memory, a register, a hard disk, a removable magnetic disk, a CD-ROM, or a storage medium in any other form in the art. For example, the storage medium may be connected to a processor, so that the processor may read information from the storage medium and write information to the storage medium. Alternatively, the storage medium may be integrated into a processor. The processor and the storage medium may be disposed in the ASIC.

The computer program instructions may alternatively be loaded onto a computer or another programmable data processing device, so that a series of operations and steps are performed on the computer or the another programmable device, so that computer-implemented processing is generated. Therefore, the instructions executed on the computer or the another programmable device provide steps for implementing a specific function in one or more procedures in the flowcharts and/or in one or more blocks in the block diagrams.

Although this application is described with reference to specific features and the embodiments thereof, it is clear that various modifications and combinations may be made to them without departing from the spirit and scope of this application. Correspondingly, this specification and accompanying drawings are merely example descriptions of this application defined by the appended claims, and are considered as any of or all modifications, variations, combinations or equivalents that cover the scope of this application. It is clear that a person skilled in the art can make various modifications and variations to this application without departing from the scope of this application. In this way, this application is intended to cover these modifications and variations of this application provided that they fall within the scope of protection defined by the following claims and their equivalent technologies.

What is claimed is:

1. A current detection apparatus, comprising:
a first induction electrical parameter generator comprising a hollow part configured to accept a detected cable, wherein the first induction electrical parameter generator is configured to generate a first induction electrical parameter and a second induction electrical parameter based on an actual current on the detected cable;
a processor;
a power supply coupled to the first induction electrical parameter generator and the processor, comprising a regulator circuit and an energy storer, and configured to:
convert a voltage in the first induction electrical parameter into a first voltage that is a power supply voltage for the processor; and
supply power to the processor;
a current detector coupled to the processor, configured to convert a current in the second induction electrical parameter into a second voltage, and comprising:
a resistor comprising:
a first end coupled to the first induction electrical parameter generator; and
a second end coupled to the first induction electrical parameter generator; and
a current sampling circuit coupled to the resistor in parallel,
wherein the processor is configured to calculate a current value on the detected cable based on the second voltage.

2. The current detection apparatus of claim 1, further comprising at least one switch coupled between the first induction electrical parameter generator and the power supply and between the first induction electrical parameter generator and the current detector, wherein the at least one switch is configured to couple the first induction electrical parameter generator to the current detector.

3. The current detection apparatus of claim 2, wherein the at least one switch comprises a first switch and a second switch, wherein the first switch is coupled between the first induction electrical parameter generator and the power supply, wherein the second switch is coupled between the first induction electrical parameter generator and the current detector, and wherein the first switch and the second switch are configured to be complementarily turned on.

4. The current detection apparatus of claim 3, further comprising a controller coupled to the at least one switch and configured to control the first switch and the second switch to be turned off and turned on.

5. The current detection apparatus of claim 4, wherein the regulator circuit is coupled to the first induction electrical parameter generator and is configured to convert the voltage in the first induction electrical parameter into the first voltage, and wherein the energy storer is coupled to the regulator circuit and is configured to store the first voltage.

6. The current detection apparatus of claim 4, wherein the first induction electrical parameter generator is a ring-shaped magnetic core that is wound with a first winding and a second winding, wherein the ring-shaped magnetic core is of a closed or non-closed structure, wherein the ring-shaped magnetic core is made of a metal material, wherein the first winding is coupled to the power supply, and wherein the second winding is coupled to the current detector.

7. The current detection apparatus of claim 3, wherein the regulator circuit is coupled to the first induction electrical parameter generator and is configured to convert the voltage in the first induction electrical parameter into the first voltage, and wherein the energy storer is coupled to the regulator circuit and is configured to store the first voltage.

8. The current detection apparatus of claim 3, wherein the first induction electrical parameter generator is a ring-shaped magnetic core that is wound with a first winding and a second winding, wherein the ring-shaped magnetic core is of a closed or non-closed structure, wherein the ring-shaped magnetic core is made of a metal material, wherein the first winding is coupled to the power supply, and the second winding is coupled to the current detector.

9. The current detection apparatus of claim 2, wherein the regulator circuit is coupled to the first induction electrical parameter generator and is configured to convert the voltage in the first induction electrical parameter into the first voltage, and wherein the energy storer is coupled to the regulator circuit and is configured to store the first voltage.

10. The current detection apparatus of claim 2, wherein the first induction electrical parameter generator is a ring-shaped magnetic core that is wound with a first winding and a second winding, wherein the ring-shaped magnetic core is of a closed or non-closed structure, wherein the ring-shaped magnetic core is made of a metal material, wherein the first winding is coupled to the power supply, and wherein the second winding is coupled to the current detector.

11. The current detection apparatus of claim 1, wherein the regulator circuit is coupled to the first induction electrical parameter generator and configured to convert the voltage in the first induction electrical parameter into the first voltage, and wherein the energy storer is coupled to the regulator circuit and is configured to store the first voltage.

12. The current detection apparatus of claim 1, wherein the first induction electrical parameter generator is a ring-shaped magnetic core that is wound with a first winding and a second winding, wherein the ring-shaped magnetic core is of a closed or non-closed structure, wherein the ring-shaped magnetic core is made of a metal material, wherein the first winding is coupled to the power supply, and wherein the second winding is coupled to the current detector.

13. An electric energy detection apparatus, comprising:
a second induction electrical parameter generator;
a voltage detector; and
a current detection apparatus that comprises:
a processor;
a first induction electrical parameter generator coupled to the processor and comprising a hollow part configured to accept a detected cable, wherein the first induction electrical parameter generator is configured to generate a first induction electrical parameter and a second induction electrical parameter based on an actual current on the detected cable;
a first power supply coupled to the first induction electrical parameter generator and the processor and configured to:
convert a voltage in the first induction electrical parameter into a first voltage that is a power supply voltage for the processor; and
supply power to the processor; and
a current detector coupled to the first induction electrical parameter generator and the processor, and configured to convert a current in the second induction electrical parameter into a second voltage,
wherein the processor is configured to calculate a current value on the detected cable based on the second voltage output by the current detector,
wherein the second induction electrical parameter generator is disposed in the hollow part and is configured to generate a third induced voltage based on an actual voltage of the detected cable,
wherein the voltage detector is separately connected to a second power supply in the current detector and the second induction electrical parameter generator,
wherein the voltage detector is configured to convert the third induced voltage into a third voltage and output the third voltage to the processor, and
wherein the current detection apparatus is coupled to the detected cable and is configured to:
detect the current value on the detected cable; and
calculate, based on the third voltage and the current value on the detected cable, electric energy transmitted on the detected cable.

14. The electric energy detection apparatus of claim 13, wherein the second induction electrical parameter generator is of a closed or non-closed cylindrical structure, wherein the second induction electrical parameter generator is made of a metal material, wherein the second induction electrical parameter generator and the detected cable form a coupling capacitor, and wherein a voltage at two ends of the coupling capacitor is the third induced voltage.

15. The electric energy detection apparatus of claim 14, wherein the voltage detector comprises:
an amplification circuit coupled to the second induction electrical parameter generator; and
a phase-shift compensation circuit separately coupled to the amplification circuit and the processor.

16. The electric energy detection apparatus of claim 13, further comprising at least one switch coupled between the first induction electrical parameter generator and the first power supply, and between the first induction electrical parameter generator and the current detector, and wherein the at least one switch unit is configured to couple the first induction electrical parameter generator to the first power supply.

17. The electric energy detection apparatus of claim 13, wherein the voltage detector comprises:
an amplification circuit coupled to the second induction electrical parameter generator; and
a phase-shift compensation circuit separately coupled to the amplification circuit and the processor.

18. A method for controlling a current detection apparatus and comprising:
 detecting a first voltage output by a power supply of the current detection apparatus; and
 when the first voltage is greater than or equal to a first preset threshold:
  disconnecting, using (i) a first switch coupled to a first induction electrical parameter generator of the current detection apparatus and the power supply and (ii) a second switch coupled to a current detector of the current detection apparatus and the first induction electrical parameter generator, the first induction electrical parameter generator from the power supply; and
  connecting the first induction electrical parameter generator to the current detector,
  wherein the first switch and the second switch are configured to be complementarily turned on.

19. The method of claim 18, further comprising, when the first voltage is less than or equal to a second preset threshold:
 connecting the first induction electrical parameter generator to the power supply; and
 disconnecting the first induction electrical parameter generator from the current detector.

20. The method of claim 18, wherein the first preset threshold is less than a maximum working voltage of a device connected to the power supply.

* * * * *